US005911553A

United States Patent [19]

[11] Patent Number: 5,911,553

[45] Date of Patent: *Jun. 15, 1999

Pickering et al.

[54] AUTOMATIC WICKETING APPARATUS

[75] Inventors: Gordon F. Pickering, Lyons; Richard E. Partch, Palmyra, both of N.Y.; Stewart L. Fluent, Cedar Falls, Iowa; Colin R. Hart, St. Joseph, Mich.

[73] Assignee: Huntsman Packaging Corporation, Salt Lake, Utah

[ * ] Notice: This patent is subject to a terminal disclaimer.

[21] Appl. No.: 09/059,652

[22] Filed: Apr. 13, 1998

Related U.S. Application Data

[63] Continuation of application No. 08/641,899, May 2, 1996, Pat. No. 5,738,478, which is a continuation-in-part of application No. 08/438,782, May 11, 1995, Pat. No. 5,522,690.

[51] Int. Cl.[6] .......... B65G 29/00

[52] U.S. Cl. .......... 414/27; 414/908; 271/903

[58] Field of Search .......... 414/27, 908, 923; 271/220, 903; 53/572; 493/204

[56] References Cited

U.S. PATENT DOCUMENTS

| | | |
|---|---|---|
| 3,625,338 | 12/1971 | Cawley . |
| 4,231,558 | 11/1980 | Aterianus et al. . |
| 4,668,158 | 5/1987 | Sample et al. . |
| 4,796,499 | 1/1989 | Achelpohl . |
| 4,850,781 | 7/1989 | DeBin et al. . |
| 5,030,191 | 7/1991 | Reifenhauser . |
| 5,074,735 | 12/1991 | Stock . |
| 5,232,325 | 8/1993 | Kohn et al. . |
| 5,542,802 | 8/1996 | Woodman et al. . |
| 5,618,147 | 4/1997 | Bandura et al. .......... 414/27 |

FOREIGN PATENT DOCUMENTS

| | | |
|---|---|---|
| 2 021 676 | 7/1970 | France . |
| 2 633 868 | 6/1989 | France . |
| 30 26 494A1 | 7/1980 | Germany . |
| 36 11 369A1 | 4/1986 | Germany . |
| 43 21 038A1 | 6/1993 | Germany . |

*Primary Examiner*—Karen M. Young
*Assistant Examiner*—Douglas Hess
*Attorney, Agent, or Firm*—Jones, O'Keefe, Egan & Peterman

[57] ABSTRACT

Apparatus for automatically removing bags from a supply conveyor and stacking a predetermined number of bags upon raised pins. The stacks are then placed on a stack transfer assembly that is then moved into a transfer station wherein the stacks are placed on wickets. An endless accumulator conveyor is arranged to deliver the wickets into the transfer station in timed relation with the movement of the transfer assembly between stations.

12 Claims, 9 Drawing Sheets

AUTOMATIC WICKETING APPARATUS

This application is a continuation of patent application Ser. No. 08/641,899, filed May 2, 1996 now U.S. Pat. No. 5,738,478, which is a continuation-in-part of patent application Ser. No. 08/438,782, filed May 11, 1995, now U.S. Pat. No. 5,522,690.

BACKGROUND OF THE INVENTION

This invention relates to apparatus for automatically stacking bags and loading the stacks upon wickets. Bags such as plastic bags for packaging bread and other products are typically manufactured on special equipment and then placed in stacks upon wickets for delivery to the producer of the product. A wicket is a wire device having two spaced apart arms that are arranged to be received in holes formed in the top sections of the bags. When a desired number of bags have been loaded upon the arms, rubber grommets are placed over the arms to hold the stack in place. The wickets are designed so that they are compatible with the producer's product loading equipment.

Heretofore, the loading of bags upon the wickets has been a manual task requiring the loader to tightly grasp a stack leaving the manufacturing equipment, aligning the holes in the bags with the wicket arms and sliding the stack over the arms. This type of manual operation is not only fatiguing, but also results in the stacks becoming misaligned or dropped, thus causing unwanted delays in the manufacturing process.

SUMMARY OF THE INVENTION

The present invention provides a solution to one or more of the problems described above. The present invention is an apparatus for stacking bags having wicket receiving holes formed therein and loading the stacks upon wickets. A loading wheel having stacker bars mounts bags coming from a manufacturing machine in stacks upon pins and then indexes the stacks to a loading station. A stack transfer assembly picks the stacks up from the stacker bars and moves the stacks to a transfer station wherein the stacks are placed upon wickets. The wickets are carried upon an endless conveyor and the movement of the wickets is coordinated with that of the transfer assembly and the loading wheel whereby the stacks flow in a steady stream from the stacking and loading equipment.

In one broad respect, the invention is a method of wicketing a stack of bags having wicket holes which comprises: stacking a preselected number of bags having wicket holes on a set of pins with the holes aligned on the pins; further aligning the stack and the holes and independently of the pins; removing the stack of bags from the pins while maintaining the independent alignment of the stack and the holes; placing the independently aligned stack on the wicket with the holes on the arms of the wicket; and releasing the independent alignment of the stack and holes with the stack on the wicket.

In another broad respect, this invention is an apparatus for wicketing a stack of bags having wicket holes, which comprises: a stacker unit having a set of pins adapted to receive a stack of bags having wicket holes with the wicket holes aligned on the pins; a wicket having arms adapted to receive the stack of bags; and a transfer assembly operable to pick up the stack of bags from the pins and to transfer the stack on to the wicket with the wicket holes aligned on the arms of the wicket, said transfer assembly including alignment means separate from said pins to keep the wicket holes in alignment during such transfer. The alignment means preferably comprises a device which is positioned within the wicket holes to take over alignment of the holes from the pins and until a wicket takes over alignment from the device. An especially preferred device comprises a pair of tubes which fit around the pins and wicket arms.

In another broad respect, this invention is an apparatus useful for receiving a stack of bags and placing the stack on wickets, comprising: at least one stacking bar unit, including pins for receiving a stack of bags having wicket receiving holes; a bag stack transfer assembly for receiving a stack of bags from the pins and for transferring the stack to a wicket, wherein the bag transfer assembly includes a set of locating tubes for receiving the pins and for receiving a stack of bags on the pins, and a set of jaws for restraining the stack of bags on the set of locating tubes; and a stack transfer station having a wicket for receiving the stack from the bag stack transfer assembly.

In another broad respect, this invention is a method useful for stacking bags and placing the stacked bags on wickets, comprising: placing a series of bags on a set of pins to form a stack of bags; inserting the set of pins with the stack of bags placed thereon into a set of receiving tubes, with the stack restrained on the receiving tubes; withdrawing the set of pins from the set of bag receiving tubes while the stack is restrained on the tubes; inserting a wicket into the tubes; releasing the stack of bags from the tubes and onto the wicket; and withdrawing the wicket and the released stack of bags from the tubes.

In yet another broad respect, this invention is an apparatus for automatically stacking bags having aligned wicket receiving holes and placing the stack upon the wickets that includes: a bag feeder for delivering bags seriatim into a bag stacking station; loading means for periodically indexing stacker bar units into said stacking station and then into a stack loading station, said stacker bar units each having upraised pins that are spaced in alignment with the wicket receiving holes when a stacker bar unit is in said stacking station so that bags delivered into said stacking station are placed upon said pins; indexing means for moving a said stacker bar unit from the stacking station into the stack loading station when a predetermined number of bags is placed upon the pins of said stacker bar unit in said stacking station; a stack transfer assembly mounted for movement of a stack of bags between said loading station and a transfer station, said transfer station containing a wicket having arms that are spaced in alignment with the holes in said bags; said stack transfer assembly including a positionable head containing hollow tubes that are spaced apart in alignment with the holes in said bags, and articulating means for reciprocating the head between a home position and a stack receiving position when the assembly is in the loading station wherein the tips of the pins are inserted into the tubes and between the home position and a stack ejecting position when the assembly is in the transfer station wherein the wickets are inserted into the tubes; and clamping means associated with said head operable when the head is in the stack receiving position to restrain bags mounted upon said pins into a stack and moving the stack from the pins onto the tubes and to remove the stack from the tubes onto the wicket when the head is in the stack ejecting position.

In another broad respect, this invention is an apparatus for accumulating a stack of bags having wicket receiving holes, comprising: a stacker wheel including a front plate and a back plate that are connected so that both plates rotate together in unison; wherein the back plate is connected to the front plate by a plurality of rotor control link assemblies;

wherein the back plate is connected to a shaft that is connected to a gearbox of a motor for driving and rotating the stacker wheel; a plurality of stacker bar units having a plurality of pins secured to a support beam of each stacker bar unit, wherein each stacker bar unit is rotatably coupled to a rotor control link assembly so that the support beams remain in a horizontal position as the stacker wheel is rotated.

In another broad respect, this invention is an apparatus for picking up and placing a stack of bags having wicket receiving holes onto a wicket, comprising: a pick-up head which comprises: alignment means for receiving and maintaining alignment of the stack of bags, a restraining jaw for restraining the stack of bags on the alignment means, and a pusher plate for pushing the stack of bags off the alignment means. It is noted that the restraining jaw may provide a degree of alignment function; however, it is important that the jaw not apply pressures on a stack of bags that result in distorting or damaging the bags. The primary function of the jaw is to keep the bags together on the alignment means.

BRIEF DESCRIPTION OF THE DRAWINGS

For a better understanding of these and other objects of the present invention, reference will be made to the following detailed description of the invention which should be read in association with the accompanying drawings wherein.

DETAILED DESCRIPTION OF THE INVENTION

Figure 1:
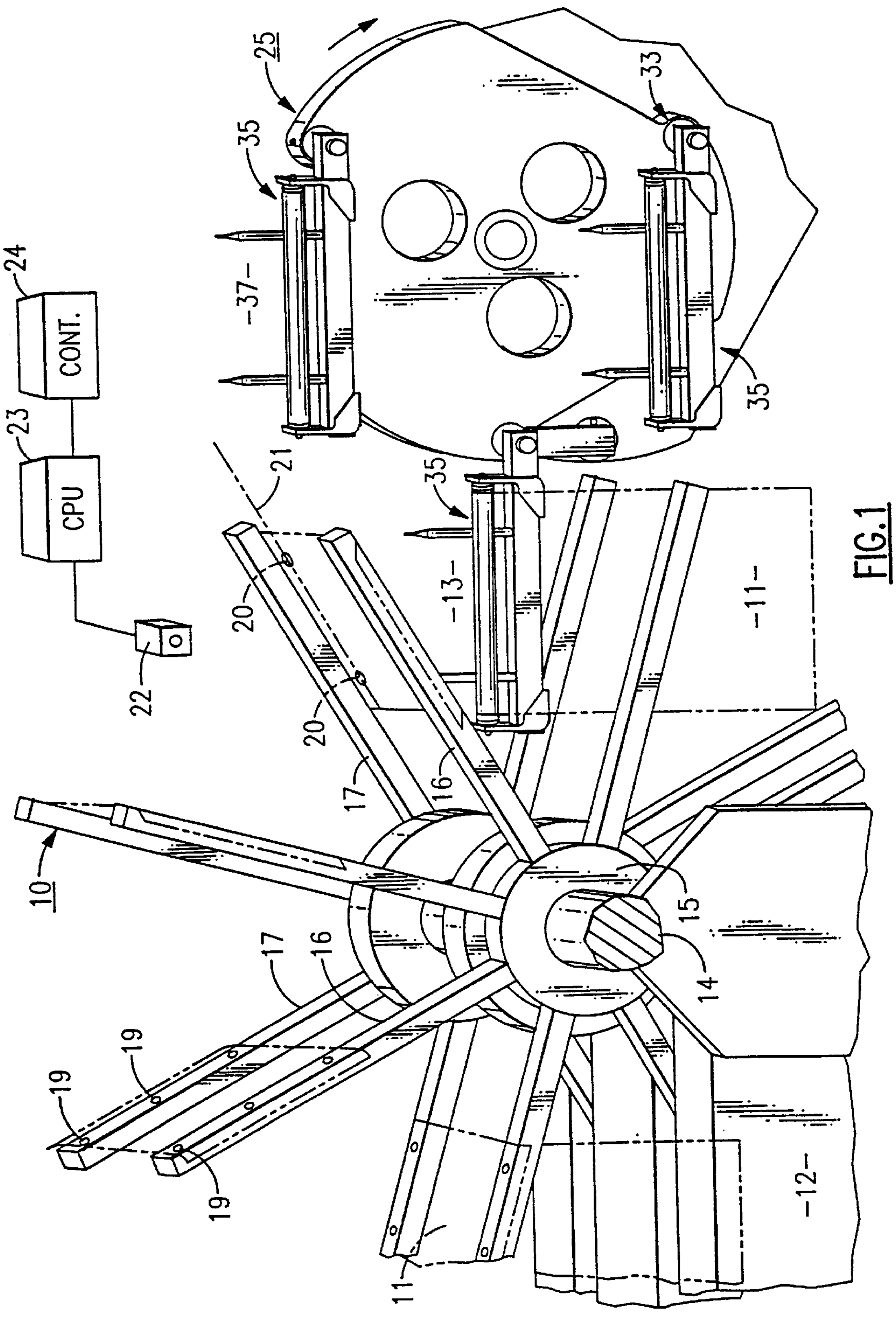
FIG. 1 is a perspective view showing a paddle wheel conveyor for placing bags coming off a bag production machine upon stacker bars mounted upon a stacker wheel.

Referring initially to FIG. 1, there is shown a paddle wheel conveyor generally referenced 10 for picking up bags 11 from a supply station 12, and conveying the bags to a stacking station 13. The paddle wheel conveyor includes a shaft 14 that is keyed to a hub 15. A series of parallelly aligned spokes 16 and 17 emanate from the hub. The spokes 16 and 17 each contain a series of vacuum ports 19—19 that are arranged to secure bags placed over the spokes to the paddle wheel conveyor. Each of the bags placed between the spokes contains a pair of wicket receiving holes 20—20 that are aligned with a common plane 21.

The paddle wheel conveyor is rotated at a predetermined angular velocity so that bags are carried seriatim into the bag stacking station 13 at a predetermined rate. A sensor 23 is positioned adjacent to the paddle wheel conveyor which is adapted to sense the passage of the spokes as they enter the stacking station. The sensor counts the number of bags delivered into a stacking station and this information is sent to a computer 24 that is arranged to store the count, process this information and issue command signals to a controller 24.

Figure 2:
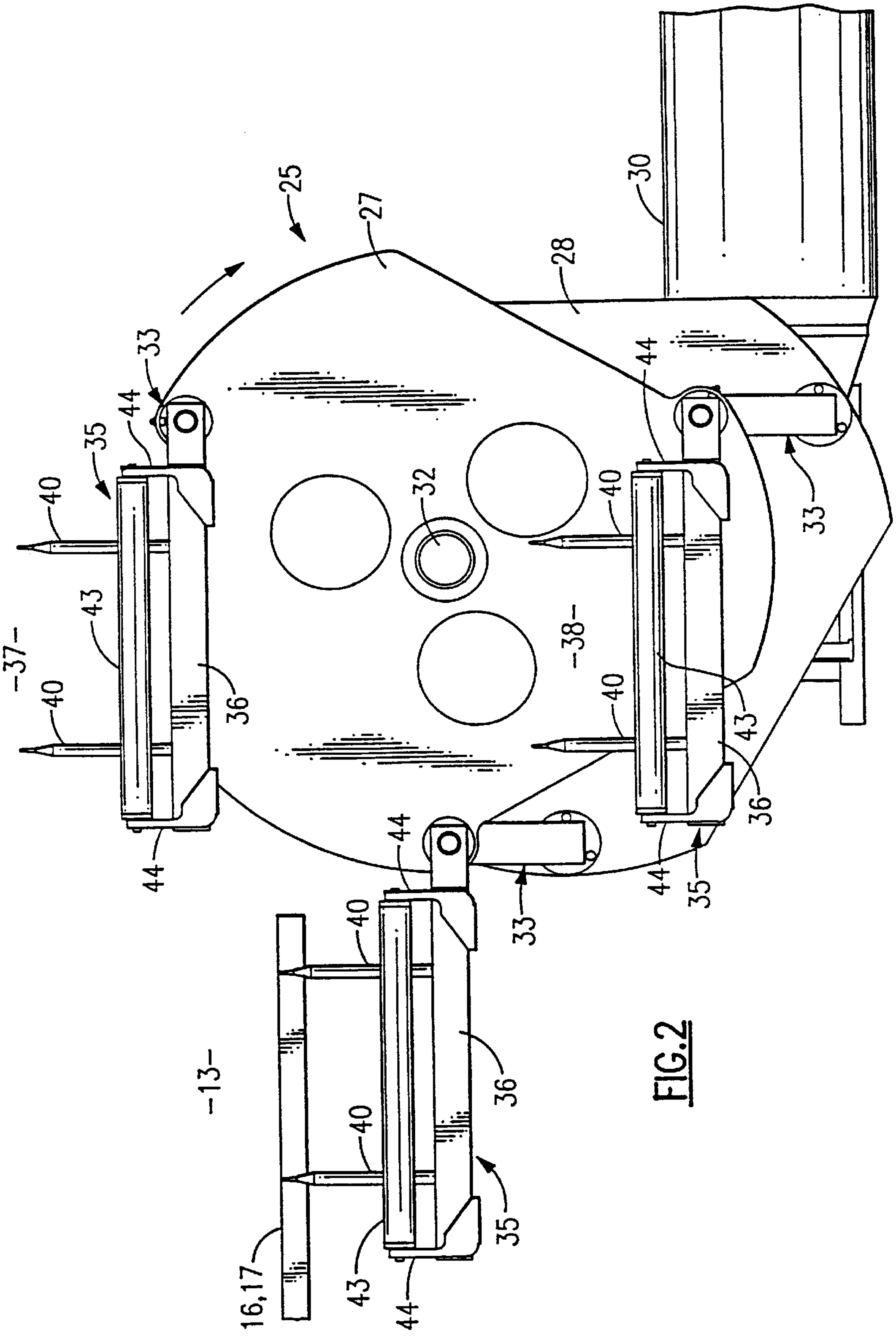
FIG. 2 is an enlarged front elevation of the stacker wheel shown in FIG. I.
Figure 3:
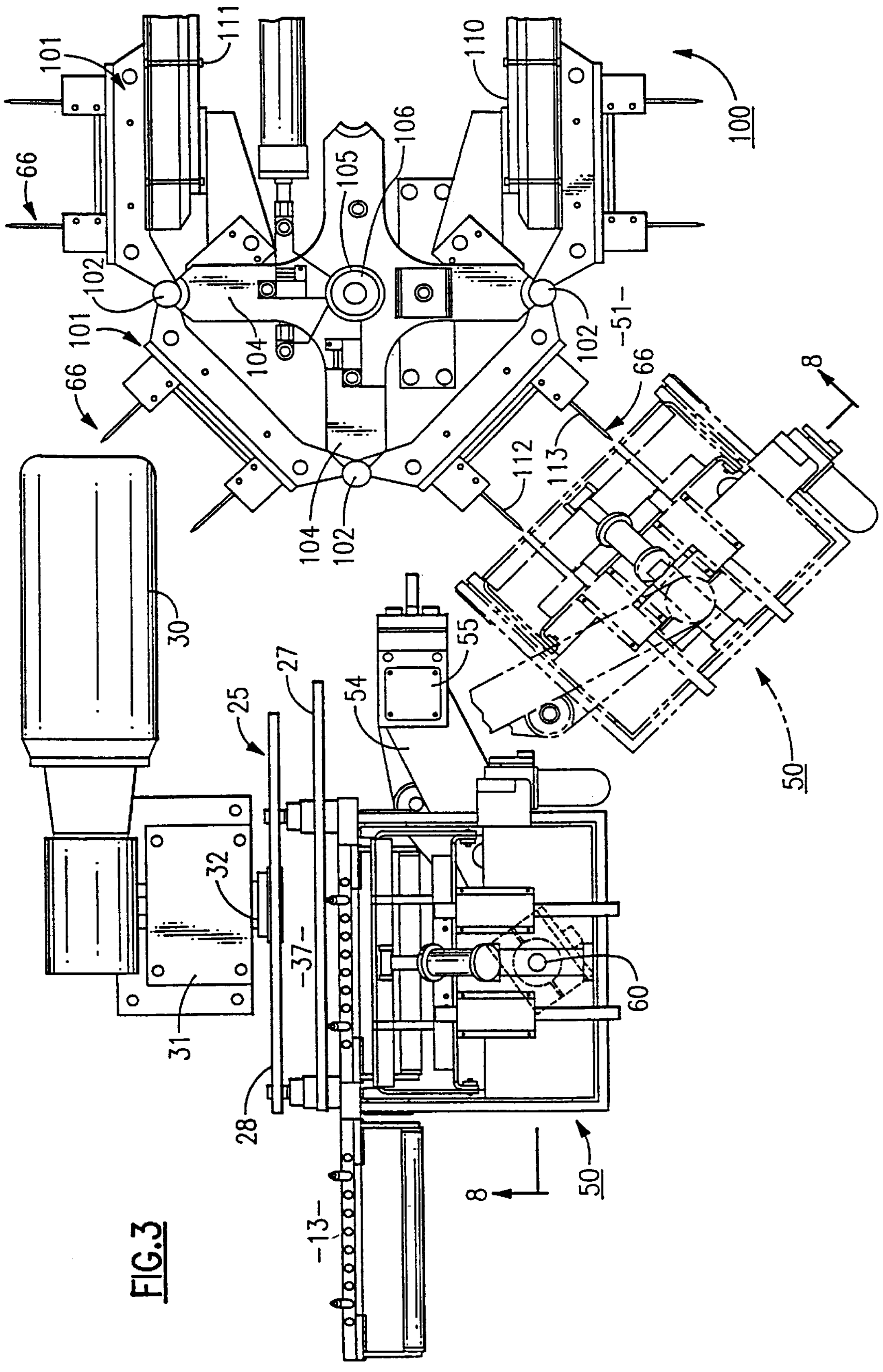
FIG. 3 is a top plan view showing a stack transfer assembly for removing stacks from the stacker wheel and placing them on wickets carried upon an endless accumulator conveyor.

A stacker wheel generally referenced 25, is mounted adjacent to the stacking station 13. With further reference to FIGS. 2 and 3, the transfer disc includes a front plate 27 which is connected to a back plate 28 so that both plates can rotate together as a unit. The stacker wheel is driven by a stepper motor 30 acting through a gearbox 31. A shaft 32 connects the gearbox to the back plate 28. The back plate, in turn, is connected to the front plate by rotor control link assemblies 33—33. Stacking bar units 35—35 are rotatably coupled to the rotor control link assemblies so that the support beams 36—36 of each stacker bar unit remain in a horizontal position as the stacker wheel is rotated in the direction indicated in FIG. 2.

The stacker wheel depicted in FIG. 2 is arranged so that it is indexed by the stepper motor upon command from the controller in 120° increments when a predetermined count is reached. While the stacker wheel depicted in FIG. 2 includes three stacking bar units, the number of units may be varied depending on the size of the stacker wheel. Thus, it is possible to include either two stacking bar units, or four or more stacking bar units, on the stacker wheel, with the increments varying depending on the number of units. The stacking bar units are thus indexed in series through the previously noted stacking station 13, a second loading station 37 and a third stand-by station 38. Each stacker bar unit includes the previously noted support beam and a pair of upraised pins 40—40 secured in the beam. The pins are spaced apart on the beam at the same center distance as the wicket receiving holes 20—20 in the bags. The stacking wheel is positioned adjacent to the paddle wheel conveyor 10 so that the pins of a stacker bar unit are brought into alignment with the bag holes when the stacker bar unit is positioned in the stacking station. Accordingly, bags carried into the stacking station on the paddle wheel conveyor are automatically placed over the pins of the stacker bar. Stop bars 42—42 (FIG. 4) are mounted upon the pins which engage the first bag placed upon the pins and thus limit the vertical travel of a stack along the pins. The stop bars 42 may be of a variety of sizes and configurations.

Figure 4:
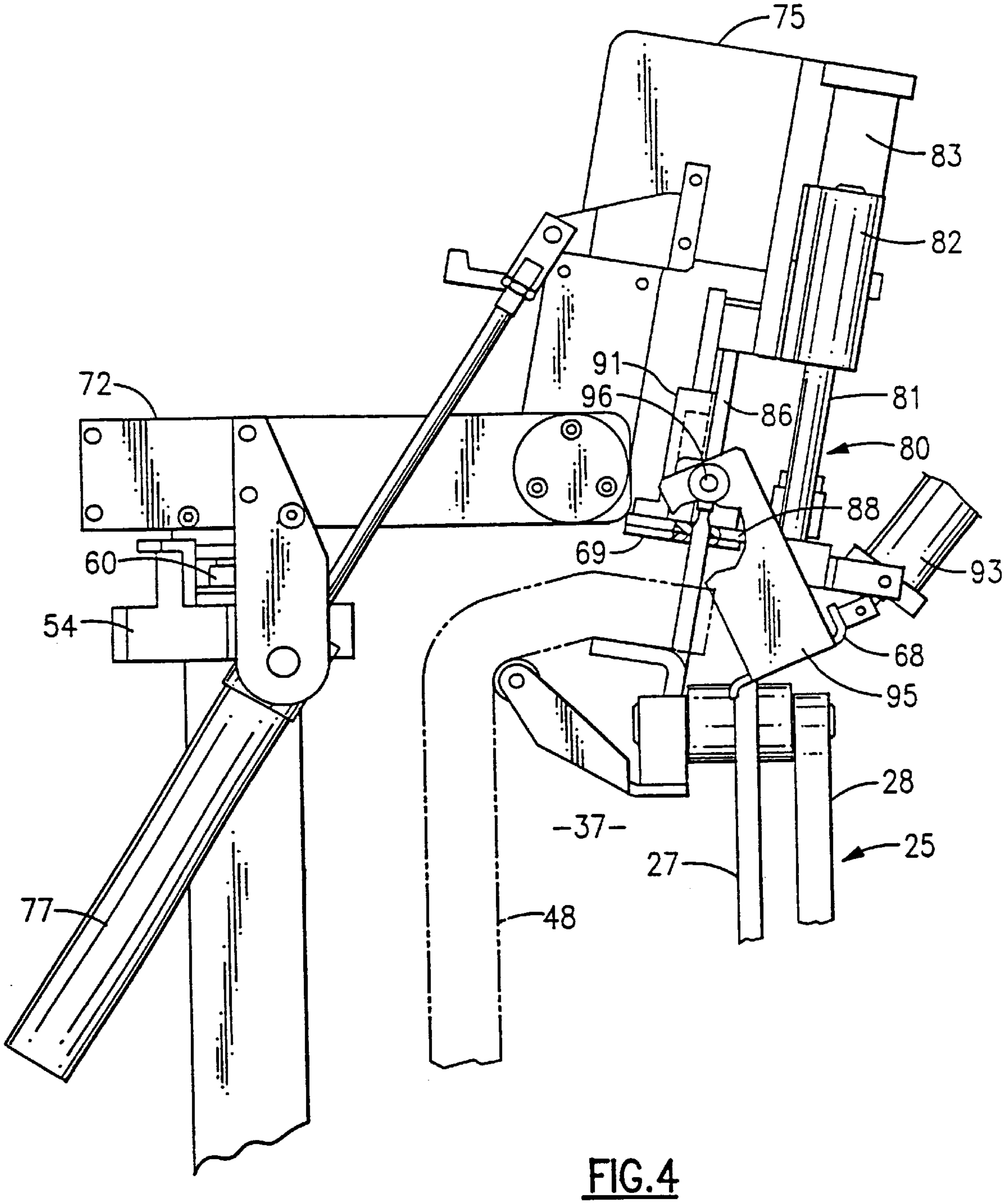
FIG. 4 is an enlarged partial side elevation showing the rotating arm of the stack transfer assembly and a pick-up head mounted on the arm with the jaws of the pick-up head in an open position preparatory to engaging a stack mounted on the stacker wheel.
Figure 5:
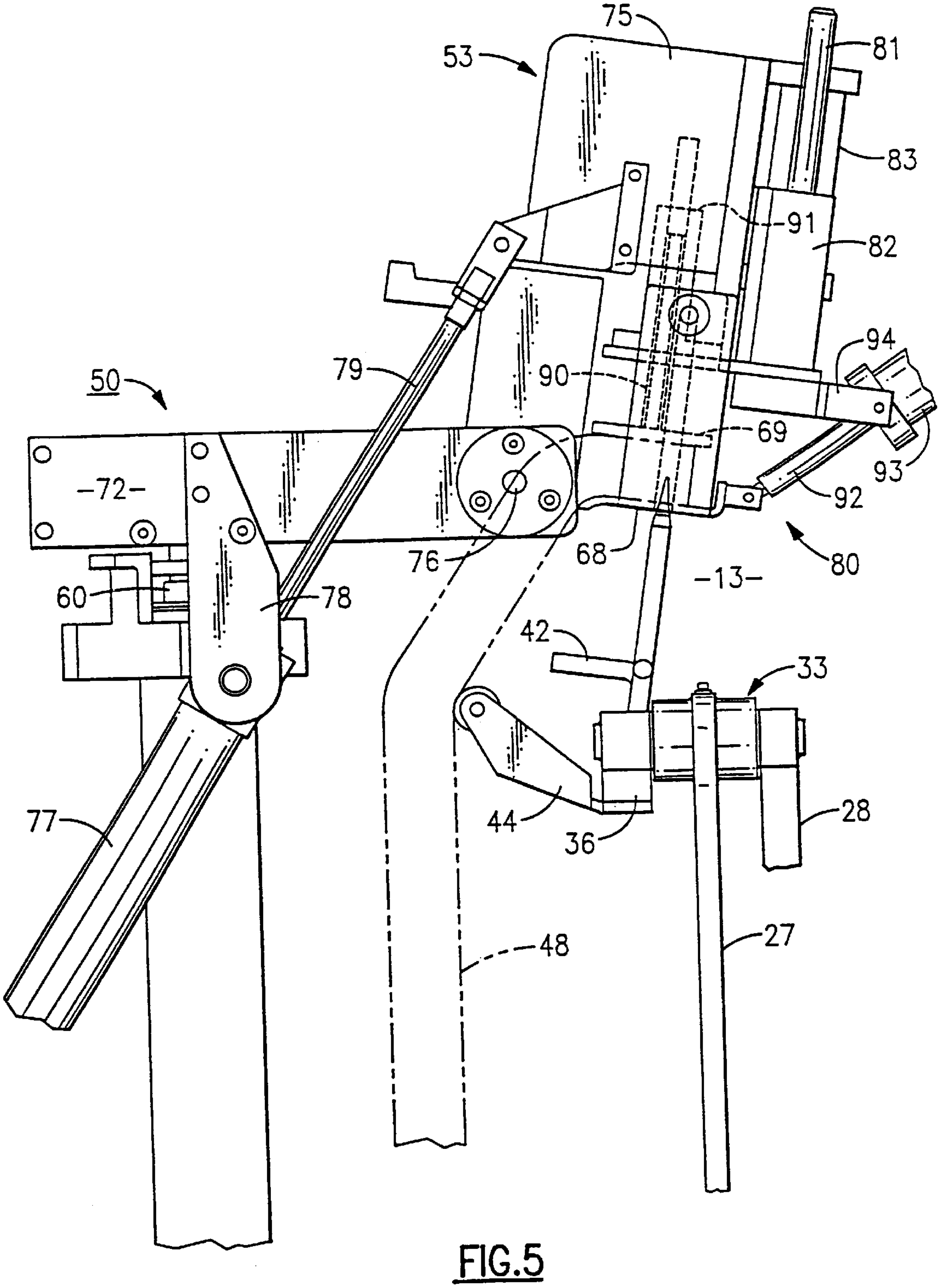
FIG. 5 is an enlarged partial side elevation showing the jaws of the pick-up head in a stack clamping position.
Figure 6:
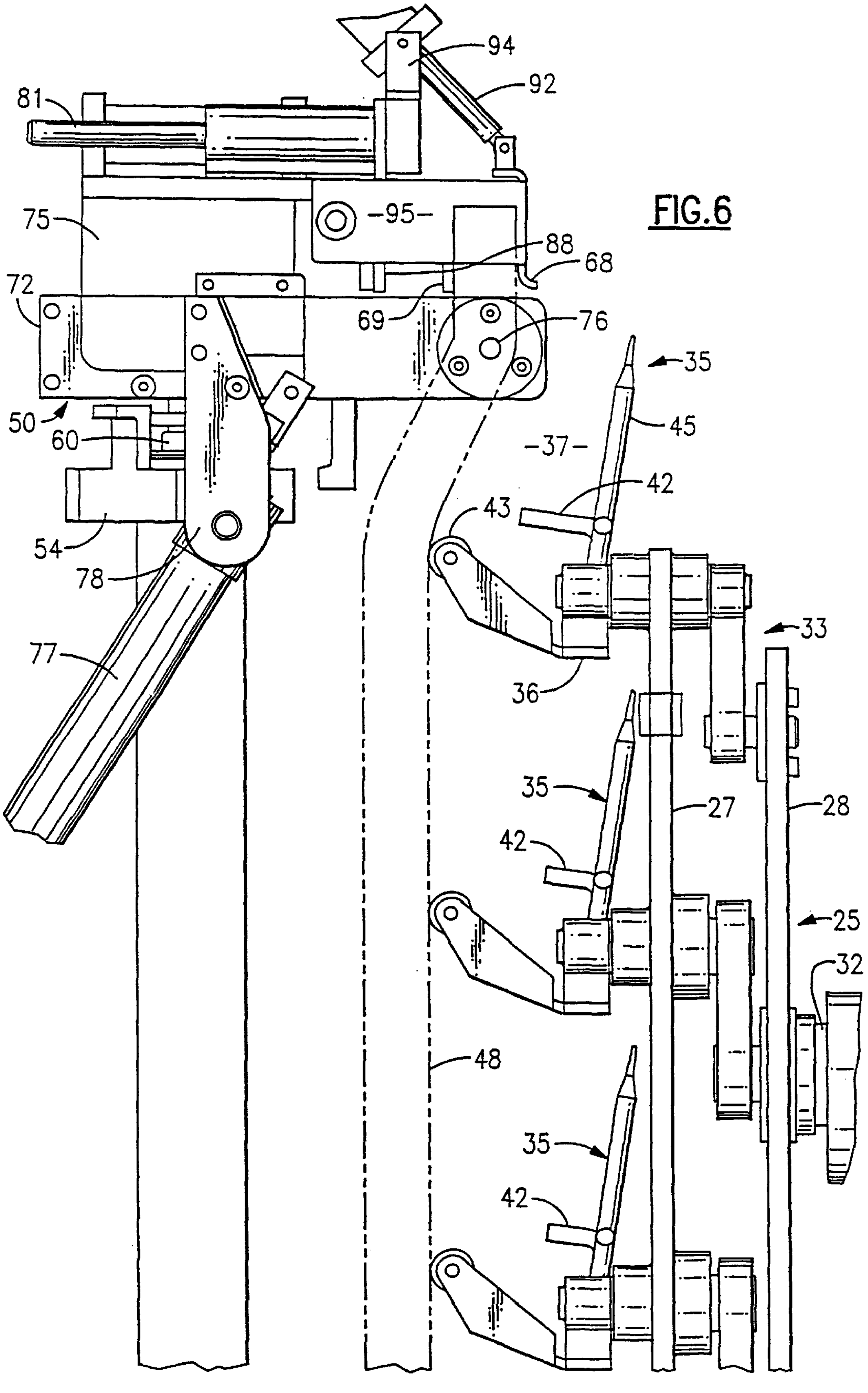
FIG. 6 is an enlarged partial side elevation showing the pick-up head of the stack transfer assembly in a home position.

A roller 43 is attached to the front of each support beam by end brackets 44—44. Bags that are stacked upon the pins hang down and are draped over the roller as shown in FIGS. 4–6. The roller helps to position the main body of the stack well forward of the stacking disc components. As noted above, the bags stacked upon the pins are counted and when a desired count is reached, the stacker wheel is indexed 120° to bring a complete stack 48 in the loading station 42.

With further reference to FIG. 3, a stack transfer assembly generally referenced 50 is arranged to pick up a stack of bags in the loading station 37 and, as will be explained in greater detail below, transfer the stack to a transfer station 51 where the stacks are automatically placed upon wickets. The assembly includes a pick-up head 53 that is carried upon the distal end of a pivot arm 54. The stack transfer assembly is depicted in FIG. 3 in fill line detail positioned in the loading station and in phantom outline in the transfer station 51.

Figure 8:
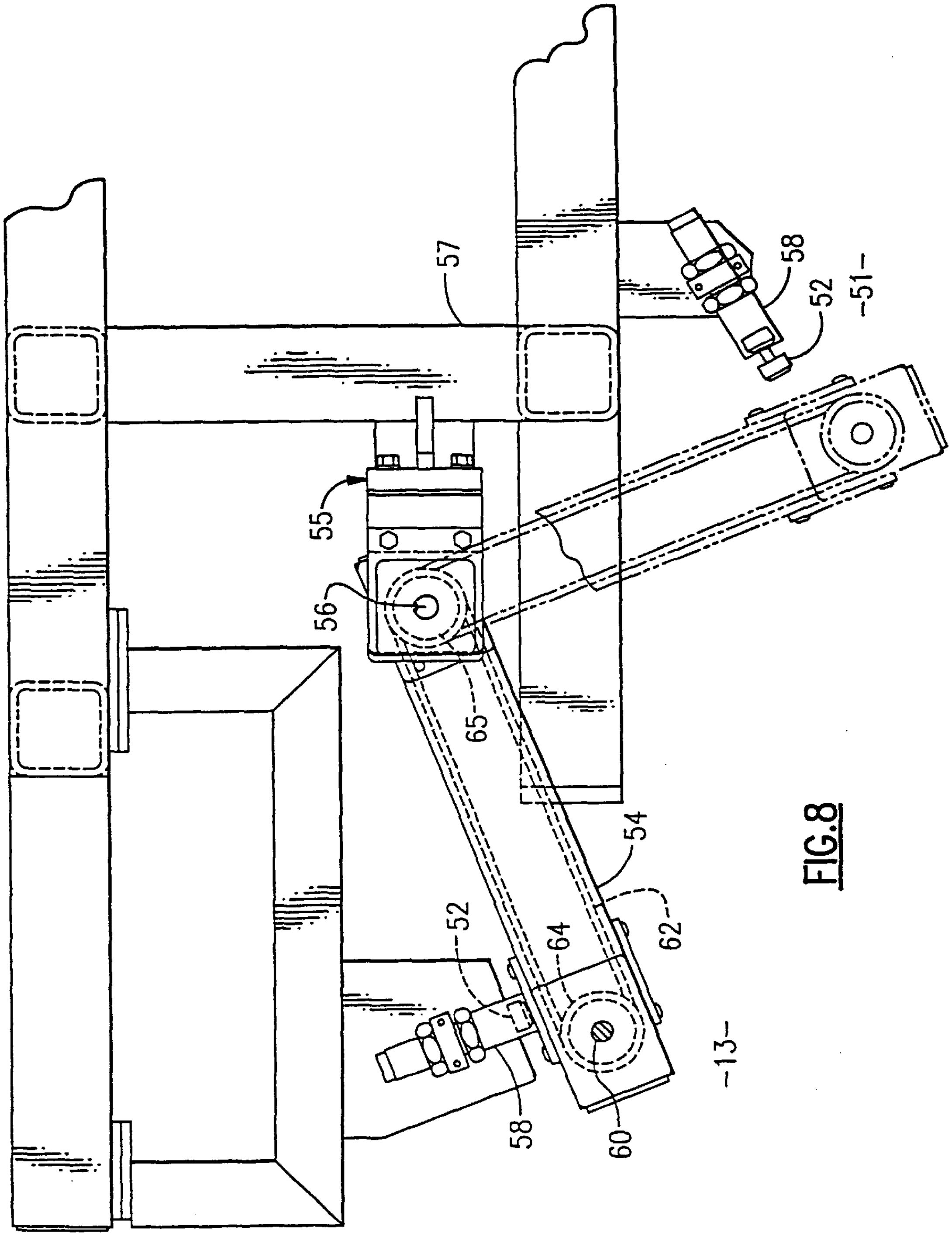
FIG. 8 is an enlarged partial side elevation taken along lines 7—7 in FIG. 3 showing the rotating arm of the stack transfer assembly in greater detail.

As best illustrated in FIG. 8, the pivot arm 54 is connected to a pneumatic actuator motor 55 by means of a shaft 56. The actuator motor is supported in stationary frame 57. Also mounted in the frame are a pair of adjustable sensor switches 58 and 59 located respectively in the loading station 37 and the transfer station 51. The switch contacts 52—52 are arranged to be depressed by the pivot arm which sends a signal through the controller to inactivate the actuator motor when the transfer assembly is properly positioned within either the loading or transfer station.

The pick-up head 53 of the transfer assembly is pivotally mounted at the distal end of the pivot arm by means of a pivot shaft 60 so that the head can rotate independently within the arm 54. The pivotal movement of the head within the arm is controlled by means of a timing belt 62 (FIG. 8) that is trained about timing sprockets 64 and 65. Timing sprocket 64 is keyed to shaft 60 while timing sprocket 65 is similarly keyed to shaft 56. The timing belt coordinates the motion of the articulated pick up head with that of the pivot arm to position the head adjacent to a stacker bar unit when the assembly is located in the loading station and adjacent to a wicket 66 (FIG. 3) when the assembly is located in the transfer position.

As illustrated in FIG. 4, the pick-up head 53 of the transfer assembly is shown with the restraining jaw 68 and pusher plate 69 of the head in an open position preparatory to engaging a bag stack 48 mounted on the stacker bar unit located in the loading station 37. The head includes a horizontally disposed platform 72 that is affixed to shaft 60 so that the platform rotates with the shaft in a horizontal plane. A housing 75 is pivotally mounted on the platform by means of a pivot 76 mounted in suitable bearing blocks so that the housing can rotate in a vertical plane within the platform. At this time the housing is tilted to the position shown by means of a tilt cylinder 77 that is secured to the platform by a support member 78. A carriage 80 is movably mounted in the top of the housing upon guide rails 81 that are slidably contained in slide blocks 82 affixed to the housing. The carriage is arranged to move over a reciprocal path of travel by means of carriage drive cylinder 83. A backing plate 85 is secured to the distal end of the rails and is arranged to move toward and away from the stack contained on the stacker unit situated in the loading station. Alignment means, depicted in the FIGS. as a pair of locating tubes 86, are mounted in the backing plate so that they move along the reciprocal path of travel with the backing plate. The alignment means may also be a set of pins, the tip of which is adapted for mating with the pins of the stacker bar unit and with the wicket.

The restraining jaw 68 and pusher plate 69 of the head are movably contained within the carriage. The rear jaw 69, which may be referred to as a pusher plate, is connected to the piston rod 90 of drive cylinder 91 so that the rear jaw (pusher plate) can move independently toward and away from the backing plate of the carriage. The front jaw 68, which may be referred to as a restraining jaw, of the stack clamping mechanism is pivotally mounted in the distal end of the piston rod 92 of a second drive cylinder 93 which, in turn, is pivotally supported in raised member 94 affixed to the carriage. A pair of control links 95 are also attached to the front (restraining) jaw and adapted to swing about rotors 96 secured in the carriage.

The jaws of the clamping mechanism are positioned as shown in FIG. 4 when the pick-up head of the transfer assembly is first brought into the loading station. At this time, the carriage is moved to a fully extended position to bring the open ends of the locating tubes over the tips of the stacker bar pins and the rear jaw (pusher plate) of the clamping mechanism brought back against the backing plate of the carriage. Openings are provided in the rear jaw (pusher plate) to permit the locating tubes to protrude slightly beyond the front face of the rear jaw when in this position. The front jaw drive cylinder 93 is now extended which, acting in conjunction with the control links 95, causes the restraining jaw to swing back clear of the top of stack 48 mounted upon the pins.

The jaw drive cylinders are now actuated from a signal from the controller to bring the jaws together. Initially, under the influence of the control links the front jaw 68 now swings down over the front face of the stack into parallel alignment with the rear jaw 69. Slots are provided in the front jaw which allow the jaw to move freely over the stacker pin. Once the jaws are in parallel alignment, they continue to move together to restrain or securely clamp the stack therebetween. With the stack so secured between the jaws, the carriage is retracted to pull the stack upwardly over the pins as illustrated in FIG. 5. It should be understood that restraining jaw 68 and rear jaw 69 need not compress the stack of bags. Instead, the jaws serve to restrain the bags from falling off the locating tubes prior to placing the stack on a wicket. In this regard, the restraining jaw serves to simply hold the bags on the tubes. The pusher plate also serves to push the stack of bags off the locating tubes and onto a wicket, after the restraining jaw has been swung away and after the tubes have come into alignment with the wicket.

With the stack free of pins, the piston rod 79 of the tilt cylinder is retracted to bring the housing of the pick-up head into a home position wherein the housing is seated upon the platform 72, as illustrated in FIG. 6. At this time, the stack remains restrained or tightly clamped between the jaws of the pick-up head. Upon instruction from the controller, the rotor arm 54 of the transfer assembly is rotated by pneumatically actuated motor into the transfer station. At the same time, the head is rotated by the timing belt arrangement into alignment with a wicket 66 mounted in the transfer station as illustrated FIG. 7. As may be appreciated, the pick-up head may also be retained in a single position, where the stacker bar units and wickets may be moved alternately in position adjacent to the pick-up head so that the pick-up head need only move vertically, such as by positioning the wicket directly above a stacking bar unit when loaded with a stack of bags (when the stacking bar unit is in a loading position).

The wickets 66 are removably mounted upon an endless belt accumulator conveyor 100 (FIG. 3). The conveyor includes a series of wicket support units 101 that are linked together by vertically disposed hinge pins 102. The conveyor is mounted between a pair of sprocket wheels 103, one of which is depicted in FIG. 3. Each sprocket contains a series of extended arms 104 attached to a central hub 105 that is rotatably supported in a vertically disposed shaft 106. An indexing motor (not shown) is coupled to one of the sprocket shafts and is arranged to index the wicket support units into the transfer station in timed coordination with the transfer assembly. The support units are guided along linear paths of travel between the sprockets by means of opposed horizontally disposed guide members 110 and 111.

Figure 7:
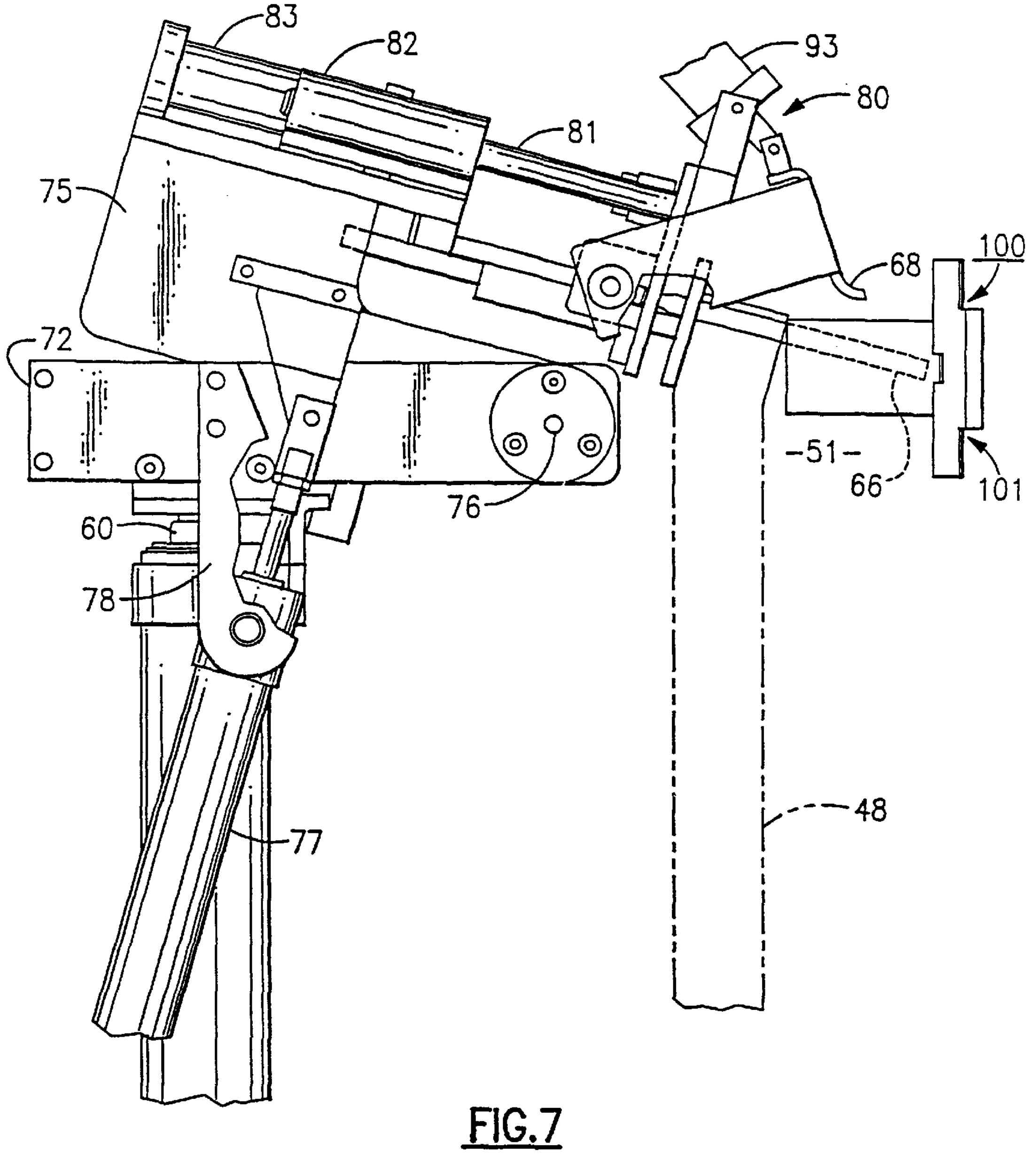
FIG. 7 is an enlarged side elevation showing the transfer assembly position in a transfer station.

When the transfer assembly is positioned in the transfer station as shown in FIG. 3, the arms 112 and 113 of the wicket positioned in the transfer station lie in the same plane as the locating tubes and the wicket receiving holes in the stack. As illustrated in FIG. 7, at this time the piston rod of the tilt cylinder is extended by a signal from the controller to the tip housing forward to place the arms of the wicket in coaxial alignment with the locating tubes and the wicket receiving holes in the bags. The carriage is moved forward so that the wicket arms move through the bag holes in the stack and enter the open distal ends of the locating tubes. At this point, the jaw drive cylinders are actuated by the controller to separate the jaws (the restraining jaw and pusher plate) and thus release the stack from the pick-up head and the head is then returned to its home position. The accumulator conveyor is now indexed one position to bring an empty wicket into the transfer station and the transfer assembly is again readied to pick up another stack in the loading station. The stacks that are collected upon the accumulator conveyor are secured to the wicket by placing rubber grommets over the wicket arms and the wickets removed from the conveyor. Fresh wickets are placed in the empty support units.

Figure 9:
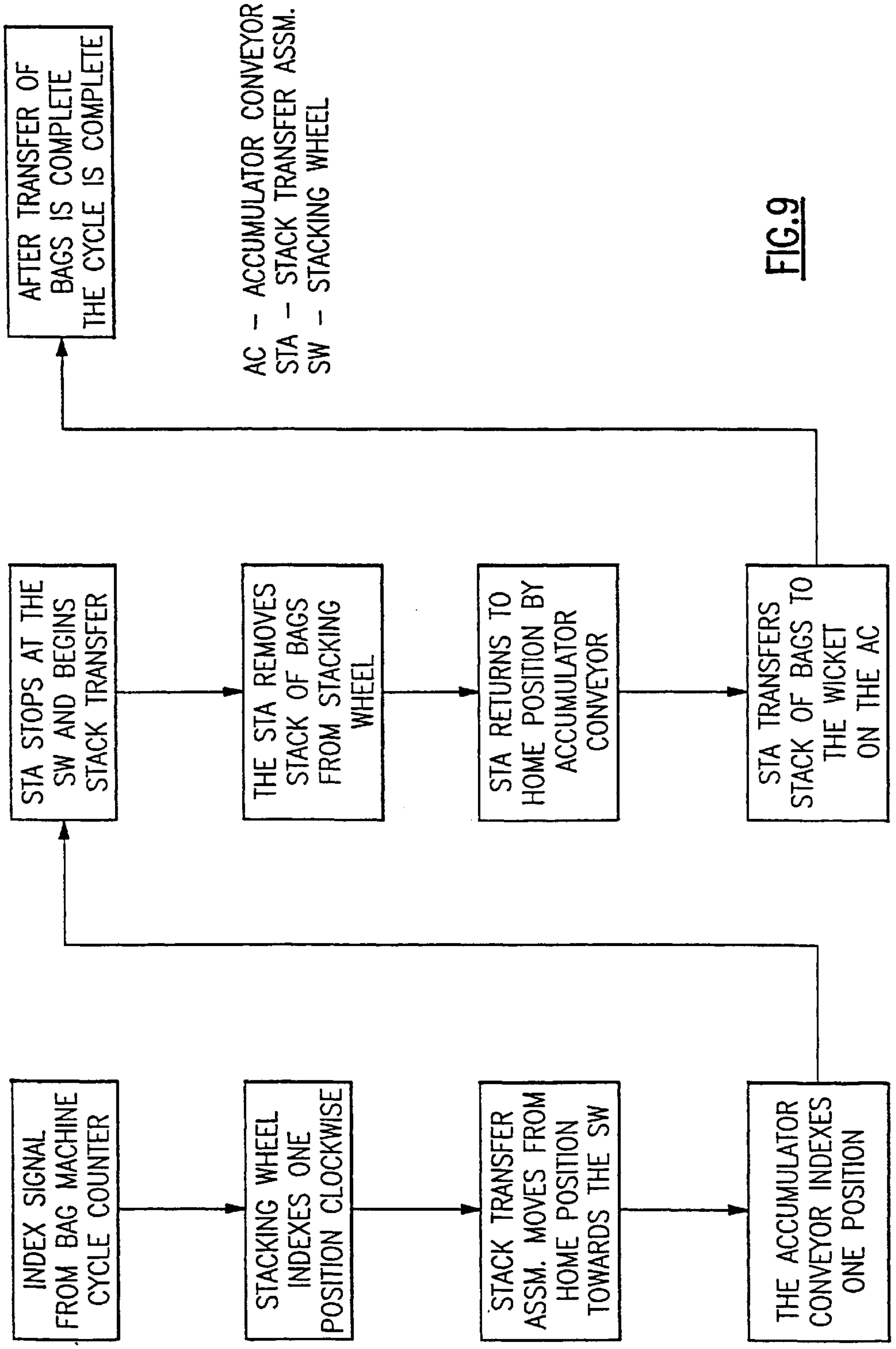
FIG. 9 is a flow diagram showing the operation of the bag stacking and stack loading equipment.

The operation of the present stacking and loading apparatus will be described in further detail with reference to the flow diagram shown in FIG. 9. Initially, an indexing signal is generated from the bag machine cycle counter when a predetermined count has been reached. The indexing signal is applied to the stacking disk stepping motor causing the disk to index 120°. This brings the stack into the stack loading station and an empty stacker bar unit into the stacking station. The stack transfer assembly now moves via the support arm from the transfer station into the loading station which, at the same time, the accumulator conveyor is indexed one position to bring an empty wicket into the transfer station.

The stack transfer assembly makes the sensor switch in the loading station and the stack loading sequence is initiated. The housing of the pick-up head is tilted to place the locating tubes in alignment with the pins of the stacker bar unit and the jaws of the head are closed to clamp or restrain the stack between the jaws. The carriage of the pick-up head is retracted thus removing the stack from the stacker bar. The head is returned to its home position and the stack transfer assembly is returned to the transfer station.

When returned to the transfer station, the housing of the pick-up head is tilted to align the arms of a wicket positioned in the station with the bag holes in the stack and the carriage moved forward to pass the arms through the holes. The jaws of the pick-up head are separated thus freeing the stack from the stack transfer assembly. The head is returned to its home position and the cycle is repeated a number of times until the desired number of wickets are loaded.

The actuator of the stack transfer assembly pneumatic motor and the pick-up head drive cylinders are carried out in a timed sequence in response from appropriate control signals from the central processing unit. The control sequence of events is completed within the time frame allotted for stacking the desired number of bags upon the stacking discs. As a result, a uniform steady flow of bag stacks are loaded onto the stack accumulator without the need of a manual operation. This considerably reduces operator fatigue and machine down time due to mishandling or misalignment of the stacks during the transfer operation.

In a commercial operation, it is common to insert a backer board over a wicket loaded with a stack of bags prior to capping the wicket ends with grommets to secure the bags on the wicket. It has been found that the backer board may be mechanically inserted over the stack of bags that is held on a set of pins on the stacking bar unit prior to the pick-up head moving into position to pick up the stack. The pick-up head may thus pick up the stack and the backer board together.

While this invention has been explained with references to the structure disclosed herein, it is not confined to the details set forth and this invention is intended to cover any modifications and changes as may come within the scope of the following claims:

What is claimed is:

1. An apparatus for accumulating a stack of bags having wicket receiving holes, comprising:

a paddle wheel conveyor for placing bags;

a stacker wheel including a front plate and a back plate that are connected so that both plates rotate together in unison; wherein the back plate is connected to the front plate by a plurality of rotor control link assemblies, wherein the back plate is connected to a shaft that is connected to a gearbox of a motor for driving and rotating the stacker wheel;

a plurality of stacker bar units having a plurality of pins secured to a support beam of each stacker bar unit for receiving the bags, wherein each stacker bar unit is rotatably coupled to a rotor control link assembly so that the support beams remain in a horizontal position as the stacker wheel is rotated;

a pick-up head which comprises:

two tubes that receive and maintain alignment of the stack of bags, a restraining jaw for restraining the stack of bags on the two tubes, and a pusher plate for pushing the stack of bags off the two tubes.

2. The apparatus of claim 1, further comprising a loading means for periodically indexing stacker bar units into a stacking station and then into a stack loading station, said stacker bar units each having upraised pins that are spaced in alignment with the wicket receiving holes when a stacker bar unit is in said stacking station so that bags delivered into said stacking station are placed upon said pins.

3. The apparatus of claim 1, further comprising an indexing means for moving a said stacker bar unit from a stacking station into a stack loading station when a predetermined number of bags is placed upon the pins of said stacker bar unit in said stacking station.

4. The apparatus of claim 1, further comprising a pivot arm pivotally mounted to the pick-up head.

5. The apparatus of claim 1, further comprising a piston rod that is connected to a drive cylinder and to the pusher plate, and a second piston rod pivotally mounted to the restraining jaw and a second drive cylinder.

6. The apparatus of claim 1, further comprising an endless belt accumulator conveyor of wickets for receiving a stack of bags from the pick-up head.

7. The apparatus of claim 1, wherein three stacking bar units are mounted to the stacker wheel.

8. The apparatus of claim 1, wherein the paddle wheel includes a shaft that is keyed to a hub.

9. The apparatus of claim 8, wherein the paddle wheel includes a series of parallelly aligned spokes emanating from the hub.

10. The apparatus of claim 9, wherein at least one spoke contains a series of vacuum ports.

11. The apparatus of claim 1, further comprising a sensor adjacent to the paddle wheel conveyor for counting bags.

12. The apparatus of claim 1, wherein the restraining jaw and pusher plate are movably contained with a carriage that is movably mounted on the pick-up head.

* * * * *